United States Patent [19]

Baker et al.

[11] Patent Number: 4,791,002

[45] Date of Patent: Dec. 13, 1988

[54] PROCESS FOR MAKING A CANNED MEAT WITH GRAVY PET FOOD

[75] Inventors: Gerald J. Baker, Wheaton; Arun K. Bansal, Barrington; John L. Konieczka, Chicago; David A. Kuntz, Glen Ellyn, all of Ill.

[73] Assignee: The Quaker Oats Company, Chicago, Ill.

[21] Appl. No.: 33,347

[22] Filed: Mar. 31, 1987

[51] Int. Cl.<sup>4</sup> .............................. A23K 1/10; A23J 1/06
[52] U.S. Cl. ....................................... 426/641; 426/92; 426/129; 426/805
[58] Field of Search ................... 426/641, 805, 2, 131, 426/92, 129, 646, 99

[56] References Cited

U.S. PATENT DOCUMENTS 3,836,685  9/1974  Schara et al. ...................... 426/131
3,914,459  10/1975  Jones ................................. 426/646
4,332,823  6/1982  Buemi ................................ 426/641

FOREIGN PATENT DOCUMENTS 2079579  1/1982  United Kingdom ................ 426/641
2149639  6/1985  United Kingdom ................ 426/641

Primary Examiner—Donald E. Czaja
Assistant Examiner—Helen Pratt
Attorney, Agent, or Firm—St. Onge Steward Johnston and Reens

[57] ABSTRACT

The invention relates to canned pet foods and to a process for preparing them. Meat and gravy pet foods are prepared which are highly palatable due to high meat and significant fat contents. The meaty pieces exhibit high integrity and the gravy component is flowable from the can and coats the meaty pieces to provide a high sheen with no significant visible fat in the gravy.

13 Claims, 2 Drawing Sheets

PROCESS FOR MAKING A CANNED MEAT WITH GRAVY PET FOOD

TECHNICAL FIELD

The invention relates to canned pet foods and to a process for preparing them; and, particularly to meat and gravy pet foods which are highly palatable due to high meat and significant fat contents, yet have meaty pieces exhibiting high integrity and a gravy component which is flowable from the can and coats the meaty pieces to provide a high sheen with no significant visible fat in the gravy.

The preparation of meat and gravy pet foods provides a number of technical problems. Unless chunks of muscle meat are employed, there is a problem of properly binding the meaty component ingredients into cohesive pieces which retain their integrity during processing including retorting after canning. Moreover, the retorting process tends to render fat from the meaty pieces and leach it, along with gelable constituents, into the gravy which often becomes clouded with visible fat, fines and other particulates, and gels, preventing free flow of the food from the container. Additionally, when producing foods of this type on a commercial scale, continuous processing is often difficult due to variations in process control which adversely affect final product quality and appearance.

BACKGROUND ART

In U.S. Pat. No. 3,836,685, R. E. Schara et al explain some of the problems associated with the fat released during the preparation of meat-in-gravy products, such as meatballs-in-gravy, meat chunks in a sauce, and the like, for either animal or human consumption. They state that such products are generally packaged in raw or partially cooked form and then cooked to their end point and sterilized by the application of heat to the sealed package using a process commonly referred to as retorting. In such a process, the fat, whether inherently contained in the meat portion or present as added fats, melts by virtue of the high temperatures to which it is subjected. As a result, the fat migrates from the meat pieces to the gravy portion of the product. Upon returning the packaged product to ambient conditions for distribution to the consumer, the melted fat returns to its solid form resulting in the formation of a "fat-cap" at the top of the package.

This fat-cap, besides being unsightly and, therefore, detrimental to consumer appeal, hinders the pourability of the contents of the can, and in some cases the products must be spooned out. Even if the packaged product is to be heated by the ultimate consumer, thereby liquifying the fat, the fat will be in the gravy portion of the product as opposed to the meat pieces, resulting in a gravy of thicker viscosity than originally formulated and also meat pieces lacking the characteristic mouthfeel imparted by the fat. To correct this problem, Schara et al add lipophilic fillers to a ground meat-containing formulation employed to make meat balls or chunks. They indicate that neither farinaceous fillers, such as wheat flour or cereal, nor proteinaceous fillers, such as finely ground caseinate, were satisfactory. However, the employment of nutritionally inert fillers adds cost, provides no nutrition, and takes the place of flavorful materials. Moreover, these inert fillers do not solve an equally serious problem of gravy gelatin with products of this type.

In U.S. Pat. No. 3,843,815, S. A. Reesman states that it is well known that the connective tissue of the principal muscles of meat used in making the meat pieces in products of the type mentioned above contains the protein collagen. Collagen on heating in the presence of moisture dissolves and yields gelatin. Thus, subjecting a packaged meat-in-gravy product to high temperatures results in a "cooking-out" of the collagen and its decendent gelatin. When the packaged product is returned to room temperature for distribution and use, the gelatin, according to its well-known properties, causes the gravy to gel and results in a final product which is not readily pourable but must be spooned out.

Reesman discloses that the addition of from about 0.5 to about 3.5 percent of a weak acid will correct this problem. However, this adds expense and acid pH values or flavors associated with certain weak acid ions, are not suitable for many food products. Moreover, this technique does not solve the problem of fat-cap formation.

In U.S. Pat. No. 3,881,031, M. Glicksman et al propose another solution to the problem of cooking out of protein with resultant gravy gelatin. They disclose that the addition of certain anionic polymers, such as sodium carrageenate, xanthan gum, gum tragacanth, sodium alginate, gum karaya, and the like, permits a retorted meat and gravy product to remain pourable after cooking. The addition of these materials, however, adds cost without solving the problem of fat cap formation.

In an earlier disclosure, in U.S. Pat. No. 3,574,633, R. J. Flier suggests that a canned meat and gravy product be cooled as rapidly as possible to minimize fatting out of the fat content of the disclosed meat chunks.

U.S. Pat. No. 3,898,345 to D. Horrocks et al is directed to preparing meat-like chunks from textured vegetable proteins, e.g., spun fibers, which are capable of canning with a gravy. They disclose forming fiber bundles and binding them into groups with a binding emulsion. The emulsion can contain flavorant such as liver, colors such as blood, fat, and other ingredients in addition to binders which can be of the heat settable type such as wheat gluten, blood plasma, egg albumen, starches and cellulose ethers, or other materials such as gelatine. They state that if the product is to be canned and sterilized in a static retort, the product can be made with sufficient integrity to withstand cutting, mixing with other materials, and canning. The materials which help to achieve this toughness by cementing the whole into a coherent mass, such as carrageenan jelly or fat, are said to be leached out of the product during sterilization, leaving a fragile chunk with the easy collapse properties of stewed steak. These products are, however, complex and costly to form and there is no indication that the problems of free fat or gravy gelatin are alleviated.

In U.S. Pat. No. 4,247,562, J. W. Bernotavitz describes a method for preparing a canned food product composed of a nutritionally fortified liquid gravy and blood-based, retort-stable, meat-like chunks for use with dry pet foods or to use alone. The chunks are composed mainly of blood and employ a gum to stabilize the blood-based chunks. The gravy has added fat, flavorings and thickeners. The product is disclosed as being retort stable, however, without the presence of high meat levels or fat contents reasonable for palatability or nutrition in the meat pieces, the disclosure is inapposite to the problems associated with meat ball and meat chunk in gravy products.

Thus, there remains a present need for a canned meat and gravy pet food which is highly palatable due to high meat and significant fat contents, which has meaty pieces exhibiting high integrity and a gravy component which is flowable from the can and coats the meaty pieces to provide a high sheen with no significant fat in the gravy. Additionally, there is a need for a process for producing foods of this type on a commercial scale.

BRIEF DESCRIPTION OF THE DRAWINGS

The present invention will be better understood and its advantages will become more apparent from the following Disclosure of the Invention, especially when read in light of the accompanying drawings wherein.

DISCLOSURE OF THE INVENTION

Figure 1:
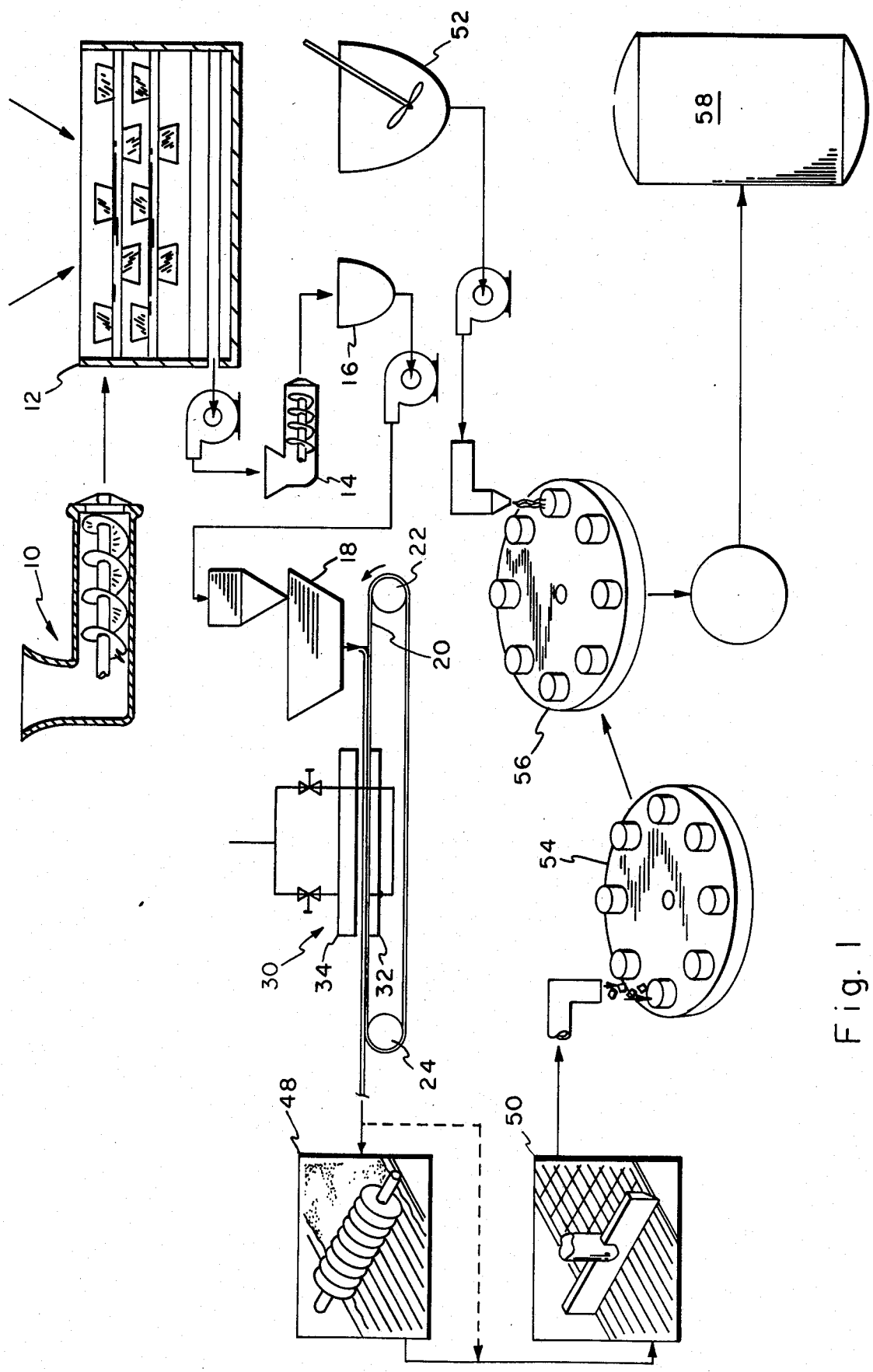
FIG. 1 is a schematic process flow diagram.

The invention provides a canned meat and gravy pet food which is highly palatable due to high meat and significant fat contents, wherein the meaty pieces exhibit high integrity and the gravy component is substantially free from visible fat and remains flowable from the can and coats the meaty pieces to provide a high sheen.

The pet food is a nutritionally-balanced, highly-palatable and visually-appealing canned pet food comprising: (a) meaty pieces having a fat content of greater than 2%, a content of at least 75% meat-derived ingredients, and sufficient soybean flour and blood plasma to provide resilience and bind the fat; in (b) a transparent, free-flowing gravy which is substantially free of visible fat.

In a preferred aspect, the meaty pieces have a fat content of from 2 to 16%, and comprise from 3 to 10% defatted soybean flour, from 2 to 12% dry blood plasma and at least 75% meat-derived ingredients including from 15 to 40% liver, wherein the combined weight of liver, soybean flour and dry blood plasma is at least 30% of the weight of the meaty pieces.

The process comprises: (a) preparing a slurry comprising soybean flour, dry blood plasma, liver, and other ingredients as necessary to achieve a total fat content of at least 6% and a total meat content of at least 75%; (b) subjecting the slurry to agitation and cutting sufficient to produce a fine meat emulsion; (c) forming a sheet of emulsion; (d) heating the sheet of emulsion to an internal temperature of at least 170° F.; (e) cutting the sheet into discrete meaty pieces; (f) feeding said meaty pieces and a clear free-flowing gravy into a can; and (g) closing and retorting said can.

More particularly, the process enables the preparation of a canned, nutritionally-balanced pet food comprising a major amount of resilient meaty pieces having a content of meat-derived ingredients of at least 75% and a fat content of from 2 to 16%, and a minor amount of a transparent free-flowing gravy which coats the meaty slices to provide a high sheen, and in its more preferred aspects the process comprises: (a) preparing a slurry comprising from 3 to 10% soybean flour, from 2 to 12% dry blood plasma, from 15 to 40% liver, and other ingredients necessary to prepare a cohesive, resilient meaty portion which is capable, upon further processing, of high speed cutting into cleanly cut slices with a minimum of fines, the combined weight of soybean flour, dry blood plasma and liver comprising at least 30% of the weight of the slurry; (b) subjecting the slurry to agitation and cutting sufficient to produce a fine emulsion having a density of greater than 55 pounds per cubic foot; (c) forming a sheet of emulsion on a continuously moving band; (d) passing said band and the sheet of emulsion thereon through steam heating means for a time sufficient to heat the sheet to an internal temperature of at least 170° F., said steam heating means comprising at least two chambers supplied with steam, including a lower chamber positioned under said band which directs steam onto the underside of said band, and an upper chamber positioned above said band with a source of steam located centrally within said upper chamber defined by walls confining the steam on all sides except for an open bottom which permits contact of steam with said sheet and narrow gaps between the sheet and entrance and exit end walls through which steam is permitted to exit, such that if the thickness of said sheet increases, the velocity of steam over said sheet also increases, thereby bringing more steam into direct contact with said sheet and increasing the heat supplied to said sheet; (e) slitting the sheet along a plurality of lines parallel to its direction of movement to produce a plurality of meaty strips; (f) slicing the strips transversely of their long axes to produce thin meaty slices with a minimum of fines and broken or ragged pieces; (g) preparing said gravy by heating a mixture comprising thickener and water in amounts sufficient to provide, after retorting and cooling, a gravy which is free-flowing from a can and coats the meaty slices to provide a high sheen; (h) filling cans with said meaty slices and gravy; and (i) retorting the cans.

Those skilled in the art recognize that nutrition is of paramount importance. It is important that each pet food be nutritionally complete. Where this is done, it is not necessary for the pet owner to balance the quantities of different foods. Thus, the nutritional intake of the pet is assured so long as it intakes a minimum amount of food. Nutritionally-balanced foods will contain protein, carbohydrates, fats, vitamins and minerals in amounts established by feeding tests to be sufficient for proper growth and maintenance.

A preferred product of the invention will meet the nutritional requirements as set forth in Nutrient Requirement of Dogs, revised 1985, which is published by the National Research Council of the National Academy of Sciences.

The unique appearance and texture of the meaty pieces and gravy of the present invention is stable through retorting to provide a canned pet food product. By the term "canned pet food" is meant any sealed, packaged pet food which has been subjected to retorting with steam at high temperature for preservation. It will thus be apparent to those skilled in the art that the term "can" in this context is broader than metal cans, and includes molded or unmolded containers of one or more polymeric or other packaging materials, as well as glass jars and the like.

The pet food product is unique in its properties for one which has a meat content of greater than 75%, and more preferably 80 to 85%, in the meaty pieces. Included within the term meat are those meat-derived ingredients defined as "meat" and "meat by-products" as defined by the current Definitions of Feed Ingredients published by the Association of American Feed Control Officials, Incorporated. As defined, the term "meat" includes not only the flesh of cattle, swine, sheep and goats, but also other mammals, poultry and fish. The term "meat by-products" is defined to include non-rendered parts of the carcass of slaughtered animals, poultry and the like. Preferred meaty materials include beef and pork liver, beef, whole chicken, chicken parts, beef and pork lungs, beef and pork spleen, turkey and other meat and meat by-products.

The overall combination of meats affects product texture, integrity and flavor. It has been determined that liver is an important ingredient in terms of texture due to its ability to form a cohesive, heat-set meaty material which resists leaching of fat and gelable protein into the gravy when used at a level of at least 10% by weight of the meaty pieces along with soybean flour and blood plasma. Levels of liver above 40% on this same basis are, however, less desirable because they tend to depress overall palatability.

The meat-derived ingredients are preferably ground prior to mixing with dry and liquid ingredients as indicated at grinder 10 in FIG. 1. At this stage, the meat-derived ingredients which can be supplied in frozen form are finely ground, preferably at near freezing temperatures. Fine grinding at this stage, e.g., through a ⅛ to ¼ inch plate, improves mixing with dry ingredients and subsequent emulsification.

The ground meat-derived ingredients are fed to a mixer, such as 12 in FIG. 1, where other ingredients of the meaty pieces are added and mixed to form a slurry. The high meat content of the pieces permits the addition of only up to about 25% by weight of other materials which will, of necessity, include dry binding ingredients and water sufficient to hydrate these binding ingredients if the moisture content of the meat-derived ingredients is not adequate.

It has been found that defatted soybean flour and dry blood plasma are effective in combination with liver in the formula, to prevent leaching of fat and gelable proteins into the gravy during retorting. Other heat settable porteinaceous binders, for example soy and cottonseed protein isolates and concentrates, also effective to prevent leaching of fat and gelable proteins into the gravy can be employed in addition to or in place of the soybean flour and blood plasma. These materials will be employed at levels effective, in the formula, to provide this desired result. Preferred formulations will contain from 3 to 10% soybean flour and from 2 to 12% dry blood plasma, in combination with at least 15%, more preferably at least 20%, liver. Desirably, the combined weight of these three binding materials will be at least 25%, preferably at least 30%, and most preferably from 35 to 50%, based on the weight of the meaty pieces. It is an advantage of the present invention that meaty pieces having the desired properties can be formed without the use of farinaceous ingredients, polysaccharide gum binders or inert fillers, and preferably the meaty pieces are substantially, if not completely, free of such.

It is another advantage of the present invention that up to about 8% free fat, such as choice white grease, tallow or lard, can be added in addition to the natural fat content of the meat for nutritional or palatability improvement without permitting substantial free fat to be visible in the gravy after retorting. The National Research Council recommends a fat content of at least 5% on a dry basis. Thus, for the high moisture product of this invention, a total fat content of the meaty pieces should be at least about 2% and will typically be up to about 16%, based on the weight of the pieces. A more preferred range is from about 6 to about 12% fat. If free fat is added, it is preferably heated sufficiently to liquefy it prior to addition.

In addition to the other ingredients, various minor ingredients such as nutritional supplements, coloring agents, antioxidants, and the like, will be added and mixed with the other ingredients sufficiently to provide a uniform slurry, say on the order of from 5 to 20 minutes. The moisture content of the slurry will typically be from 55 to 65%, preferably from 58 to 62% by weight, and will have a density of about 66 pounds per cubic foot.

The slurry, while being uniform, finely-ground and suitable for the preparation of pet foods other than one which must form well-defined, sliced pieces that must also survive retorting without loss of significant fat or gelable protein to the gravy, must be subjected to further agitation and cutting to form an emulsion. The slurry is therefore pumped from mixer 12 to emulsifier 14, still at a temperature just below about freezing. In one representative type of emulsifier, the slurry is advanced by a screw conveyor and forced through a series of knives and cutting plates. The emulsifier imparts significant mechanical work to the slurry, raising its temperature by, for example, as much as 25° F., typically about 15° F., by the time it exits the emulsifier, preferably as a fine creamy emulsion. The emulsion should have a density above 55, preferably above 60, pounds per cubic foot or unsightly pieces, ragged cutting, broken pieces, and excess fines may result. More preferred densities range from about 61 to 66 pounds per cubic foot.

The emulsion is then formed into a sheet of emulsion and heated to an internal temperature of at least 170° F. to assure sufficient heat setting of the formulation to prevent significant fat or gelable protein to be leached during retorting and to enable slicing to obtain clean cut corners with a minimum of fines and broken pieces. The exact temperature may vary and will typically be within the range of from 172° to about 190° F., preferably about 180° F. and above.

The exact means for shaping the sheet of meaty material and heating are not critical, but these operations should be conducted so that the final product is of highly uniform appearance and integrity. FIG. 1 shows the emulsion being held in a tank 16 prior to being forced through a former 18 onto continuous metal band 20 supported and driven in the direction of the arrow by drums 22 and 24. The former 18 can have a plurality of die openings to form a plurality of narrow-sheets, i.e., strips, of emulsion on the band or can have one continuous die opening which extends essentially the entire width of the band to form an accordingly wide sheet. Where the die opening is of the wider variety, the die lands at the ends of the die for forming the sheet edges are desirably configured, such as by widening the gap between front and back forming die lands, to obtain as nearly square as possible ends on the sheet. The thickness of the sheet should be controlled as nearly as possible to obtain a sheet of uniform thickness, say from 8 to 12 millimeters, preferably from about 8.5 to about 10 millimeters prior to heating. Careful control of sheet thickness will affect not only the size and uniformity of the final meaty pieces, but also the ability to achieve uniform heating, with its important attendant results, on a continuous basis.

Figure 2:
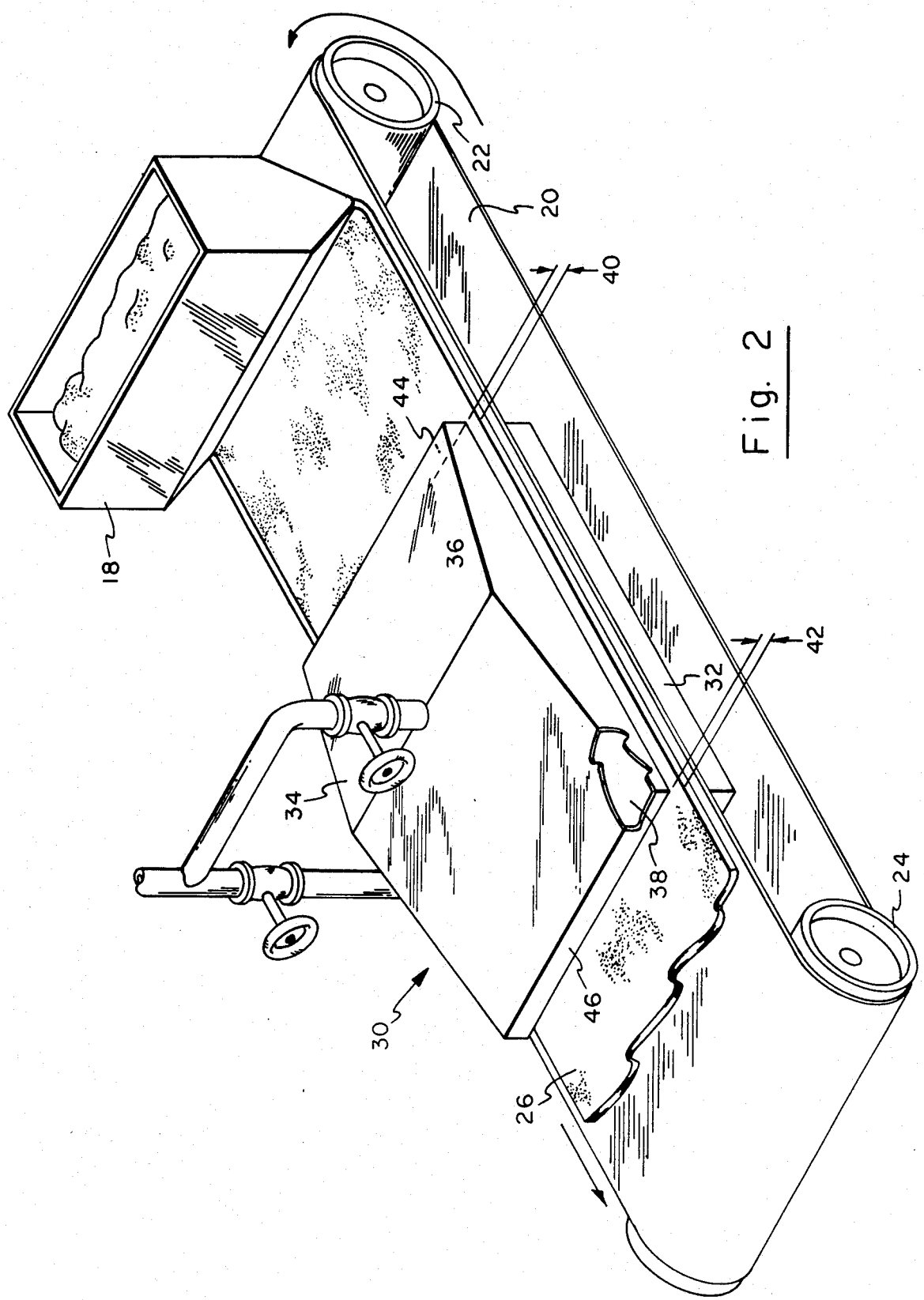
FIG. 2 is a schematic view, in perspective, showing a preferred unit operation for heat setting a meaty emulsion into resilient meaty material which can be sliced and canned with a gravy component.

While heating means such as microwave and radiant ovens can be employed, it has been determined that steam heating, especially when conducted in the manner schematically shown in FIG. 2, offers significant advantages when operating on a continuous basis.

Some variation in the thickness of the sheet is inevitable despite the fact that precautions are taken, and any significant increase in sheet thickness can cause under cooking of the sheet with its attendant problems of poor cutting, high percentages of fines and broken pieces, and leaching of substantial fat and gelable protein into the gravy during retorting. It has been found, however, that steam heating in the manner illustrated in FIG. 2 mitigates the problems associated with sheet thickness variation to some extent.

The band 20 carrying the sheet of emulsion 26, shown in FIG. 2, is preferably passed through the steam heating means, shown generally as 30, for a time sufficient to heat the sheet to an internal temperature of at least 170° F. The steam heating means 30 comprises at least two chambers, 32 and 34, each supplied with steam. Lower chamber 32 is positioned under the band 20 and directs steam onto the underside of the band. Upper chamber 34 is positioned above the band with a source of steam 36 located centrally within the upper chamber. The upper chamber 34 is shown to be defined by walls on all sides except for an open bottom 38 which permits direct contact of the steam with the sheet and narrow gaps 40 and 42 between the sheet 26 and entrance wall 44 and exit wall 46. Typically, gap 40 will be from 10 to 12 millimeters in height and gap 42 will be from 8 to 10 millimeters in height.

Steam is permitted to exit the upper chamber 34 through gaps 40 and 42. The size of the gaps, determined by the height of walls 44 and 46 above the sheet, controls the rate of flow of steam through the gaps and, therefore, the quantity of steam which directly contacts a given area of the sheet and the rate of heat supplied to the sheet. Therefore, as the thickness of the sheet 26 increases, the gaps 40 and 42 narrow, thereby bringing more steam into direct contact with the sheet and increasing the rate at which heat is supplied to the sheet.

Following heating, the resulting sheet of meaty material is sliced, i.e., cut, into appropriately-sized pieces for a canned meat and gravy pet food product. Preferred sliced pieces will be dices of square or rectangular shape, or thin slices of from about 5 to about 6 millimeters in thickness. The preparation of the thin slices of uniform size and with clean cuts and a minimum of fines are especially difficult, and the process of the invention provides especially good results.

Where a wide sheet is formed, it is preferred to slit the sheet, such as with a plurality of disc-shaped cutters, shown at 48 in FIG. 1, similar to rotary pizza cutters, along a plurality of lines parallel to the direction of sheet movement. In this case, as in the case where narrower strips of emulsion are initially formed, the strips are sliced transversely to the direction of movement such as by a high speed guillotine cutter as shown at 50 in FIG. 1.

A gravy component is prepared for canning with the meat pieces. The gravy will typically comprise at least a thickener such as flour, regular and modified food starch, pregelatinized starch, vegetable or other gums, or the like, and water. It may also contain sucrose, corn syrup, salt, color, flavors, minor nutrients or the like. Preferably, a mixture of from 2 to 7% starch, from 2 to 7% sugar, and water is heated, as shown at kettle 52 in FIG. 1, to provide a thickened gravy which when applied to the meaty pieces provides a high sheen to the pieces.

The meaty pieces and gravy are canned and retorted in conventional manner to provide a canned meat and gravy pet food which is visually appealing due to the cleanly-cut, resilient meaty pieces which are given a high sheen by the gravy which remains clear and free flowing without any significant visible fat or an excess of fines. The meaty pieces will typically comprise at least 45%, and preferably a major portion of the canned product, with the gravy forming a minor portion, by weight. Preferably, the product will comprise from 50 to 60% by weight of meaty pieces. The meaty pieces are preferably fed to the cans at filler 54 prior to adding the gravy at filler 56. Retorting, for example in retort 58, will be under conditions effective to preserve the canned product, say by steam retorting. Upon opening the cans, the meat and gravy product easily pours from the cans.

Best Mode for Carrying out the Invention

The following examples further illustrate and explain the invention by detailing the production, not only of a product having thinly sliced meaty pieces but also one having meaty pieces sliced into dices. Unless otherwise indicated, all parts and percentages are on a weight basis.

EXAMPLE 1

Blocks of frozen meat and meat by-products (beef, liver, lungs and spleens) are tempered overnight. The tempered meats are ground through an Autio grinder equipped with 3/16" hole grind plate. These meats are mixed with dry and liquid ingredients in the proportion outlined in Table I. Mixing is performed in a Patterson twin-shafted mixer for 15 minutes. The blend is emulsified through a Karl Schnell emulsifier equipped with dual cutting plates, the first plate having 3.0 mm holes and the second having 1.7 mm holes. The resulting fine emulsion is transferred to a Hutt DP formpress. The formpress produces a 9.3 mm thick×280 mm wide emulsion sheet at the rate of 280 lb/hr. This sheet is passed through a steam tunnel, similar to that depicted in FIG. 2, with a residence time of two minutes. Temperature of raw emulsion entering the steam tunnel is 59°–68° F. and it is raised to 176°–181° F. at the steam tunnel discharge. The cooked, firm sheet is sliced with the slitter knives spaced 25 mm apart.

The newly formed strips are guillotine cut about 5.5 mm long. The slice dimensions after guillotine cut are 24.5 mm×10.7–12.4 mm×5.5 mm. These slices are filled into cans with a Solbern filler. A gravy is prepared according to formula given in Table I and is heated in a jacketed kettle. The hot gravy is added to the slices via an FMC piston filler. The filled 307×111 cans are retorted in a still retort. The finished product has a very appetizing appearance and is very palatable to dogs.

TABLE I

Sliced Beef Dinner Formula

| Ingredient | Beef Slices (52%) | Gravy (48%) |
|---|---|---|
| Water | 1 | 90 |
| Beef | 30 | — |
| Beef Lungs | 20 | — |
| Pork Liver | 20 | — |

TABLE I-continued

| Ingredient | Beef Slices (52%) | Gravy (48%) |
|---|---|---|
| Beef Spleen | 13 | — |
| Soybean Flour, Defatted | 7 | — |
| Sugar | — | 5 |
| Powdered Blood Plasma | 4.5 | — |
| Modified Waxy Maize Starch | — | 4 |
| Animal Fat | 2 | — |
| Salt | 1 | 0.5 |
| Dicalcium Phosphate | 1 | — |
| Color | — | 0.5 |
| Vitamins, Minerals and Antioxidant | 0.5 | — |
| | 100.00 | 100.00 |

EXAMPLE 2

The formula outlined in Table II is used to produce a canned dog food containing chicken-flavored dices in a shiny gravy. The meat emulsion is prepared using the procedure outlined in Example 1. The emulsion is extruded through a Hutt DP formpress equipped with a die block which has a plurality of rectangular openings of 8 mm×8 mm cross-section. Emulsion strip-shaped sheets exit this die. The average gap between two adjacent strips is 5.4 mm. The emulsion strips are cooked in the steam tunnel for about one minute which results in a 185° F. product temperature at the tunnel exit. The cooked strips are guillotine cut to 12.5 mm length. The dice dimensions after guillotining are 12.5 mm long×9.0 mm wide×8.6 mm thick. These dices are canned along with 195° F. gravy (composition outlined in Table II) in 307×111 cans. The cans are retorted in a still retort. The resultant product has tan color chicken dices immersed in a light gravy. Kennel tests show the product to be very palatable.

TABLE II

| Ingredient | Chicken Dices (52%) | Gravy (48%) |
|---|---|---|
| Water | 1 | 90 |
| Pork Liver | 40 | — |
| Chicken Parts | 16 | — |
| Whole Chicken | 16 | — |
| Beef Lungs | 12 | — |
| Soybean Flour, Defatted | 6 | — |
| Sugar | — | 5 |
| Powdered Blood Plasma | 5 | — |
| Modified Waxy Maize Starch | — | 4 |
| Animal Fat | 1 | — |
| Salt | 1 | 0.5 |
| Dicalcium Phosphate | 1 | — |
| Caramel Color, Liquid | — | 0.5 |
| Color, Vitamins, Minerals, and Antioxidant | 1 | — |
| | 100.000 | 100.00 |

The above description is for the purpose of teaching the person of ordinary skill in the art how to practice the present invention, and it is not intended to detail all those obvious modifications and variations which will become apparent to the skilled worker upon reading the description. It is intended, however, that all such obvious modifications and variations be included within the scope of the present invention which is defined by the following claims.

What is claimed is:

1. A process for preparing a canned pet food comprising resilient meaty slices in a free-flowing gravy, the process comprising:
   (a) preparing a slurry by grinding a mixture comprising liver and other meat and meat by-products and incorporating therein a binder comprising soybean flour and dry blood plasma to achieve a total fat content of at least 2% and a total meat content of at least 75% by weight including from 15 to 40% by weight of liver;
   (b) subjecting the slurry to agitation and cutting sufficient to produce a meat emulsion;
   (c) forming a sheet of emulsion;
   (d) heating the sheet of emulsion to an internal temperature of at least 170° F.;
   (e) cutting the sheet into discrete meaty pieces;
   (f) feeding said meaty pieces and a clear free-flowing gravy into a can; and
   (g) closing and retorting said can.

2. A process according to claim 1 wherein from 3 to 10% by weight of slurry is soybean flour and from 2 to 12% by weight is blood plasma and the combined weight of soybean flour, dry blood plasma and liver is at least 25% by weight of the slurry.

3. A process according to claim 1 wherein the density of said emulsion is at least 55 pounds per cubic foot.

4. A process according to claim 1 wherein the sheet is cut into thin slices.

5. A process according to claim 1 wherein the sheet is heated from below by steam applied to the underside of a continuous metal band carrying said sheet and from above by a steam chamber positioned over the sheet; said steam chamber permitting flow of steam from a source centrally located within said steam chamber and directly over said sheet and out at least one gap between the sheet and the chamber such that if the thickness of said sheet increases, the velocity of the steam over said sheet also increases, thereby bringing more steam into contact with said sheet and increasing the heat supplied to the sheet.

6. A process for preparing a canned, nutritionally-balanced pet food comprising a major amount of resilient meaty slices having a content of meat-derived ingredients of at least 75% and a fat content of from 2 to 16%, and a minor amount of a transparent free-flowing gravy, the process comprising:
   (a) preparing a slurry by grinding a mixture comprising liver and other meat and meat by-products and incorporating therein a binder comprising from 3 to 10% based on the total weight of slurry, of soybean flour and from 2 to 12%, based on total weight of slurry, of dry blood plasma to provide a cohesive, resilient meaty portion, containing from 15 to 40% by weight of liver, which is capable of high speed cutting into cleanly cut slices with a minimum of fines, upon further processing;
   (b) subjecting the slurry to agitation and cutting sufficient to produce a fine emulsion having a density of greater than 55 pounds per cubic foot;
   (c) forming a sheet of emulsion on a continuously moving band;
   (d) passing said band and the emulsion sheet thereon through steam heating means for a time sufficient to heat the sheet to an internal temperature of at least 170° F.;
   (e) slicing the sheet into meaty pieces;
   (f) preparing a transparent gravy;
   (g) filling cans with the meaty slices and gravy; and (h) retorting the cans.

7. A process according to claim 6 wherein the sheet is sliced into meaty pieces by first slitting the sheet along a plurality of lines parallel to its direction of movement to produce a plurality of meaty strips; and then slicing the strips transversely to their long axes to produce thin meaty slices with a minimum of fines and broken or ragged pieces.

8. A process according to claim 6 wherein the combined weight of liver, soybean flour and dry blood plasma comprises at least 25% of the weight of the slurry.

9. A process according to claim 8 wherein the combined weight of liver, soybean flour and dry blood plasma comprises 30 to 50% of the weight of the slurry.

10. A process according to claim 6 wherein said steam heating means comprises at least two chambers supplied with steam, including a lower chamber positioned under said band which directs steam onto the underside of said band, and an upper chamber positioned above said band with a source of steam located centrally within said upper chamber defined by walls confining the steam on all sides except for an open bottom which permits contact of steam with said sheet and narrow gaps between entrance and exit end walls through which steam is permitted to exit, such that if the thickness of said sheet increases, the velocity of steam over said sheet also increases, thereby bringing more steam into direct contact with said sheet and increasing the heat supplied to said sheet.

11. A process according to claim 6 wherein said gravy is prepared by heating a mixture comprising thickener and water in amounts sufficient to provide, after retorting and cooling, a gravy which is free-flowing from the can and coats the meaty slices to provide a high sheen.

12. A process for preparing a canned, nutritionally-balanced pet food comprising a major amount of resilient meaty pieces having a content of meat-derived ingredients of at least 75% and a fat content of from 2 to 16%, and a minor amount of a transparent free-flowing gravy which coats the meaty slices to provide a high sheen, the process comprising:

(a) preparing a slurry comprising from 3 to 10% soybean flour, from 2 to 12% dry blood plasma, from 15 to 40% liver, and other meat and meat by-products said slurry being in the form of a cohesive, resilient, meaty portion which is capable, upon further processing of high speed cutting into cleanly cut slices with a minimum of fines, the combined weight of soybean flour, dry blood plasma and liver comprising at least 30% by weight of the slurry;

(b) subjecting the slurry to agitation and cutting sufficient to produce a fine emulsion having a density of greater than 55 pounds per cubic foot;

(c) forming a sheet of emulsion on a continuously moving band;

(d) passing said band and the sheet of emulsion thereon through steam heating means for a time sufficient to heat the sheet to an internal temperature of at least 170° F., said steam heating means comprising at least two chambers supplied with steam, including a lower chamber positioned under said band which directs steam onto the underside of said band, and an upper chamber positioned above said band with a source of steam located centrally within said upper chamber defined by walls confining the steam on all sides except for an open bottom which permits contact of steam with said sheet and narrow gaps between the sheet and entrance and exit end walls through which steam is permitted to exit, such that if the thickness of said sheet increases, the velocity of steam over said sheet also increases, thereby bringing more steam into direct contact with said sheet and increasing the heat supplied to said sheet;

(e) slicing the sheet into meaty pieces;

(f) preparing said gravy by heating a mixture comprising thickener, sugar and water in amounts sufficient to provide, after retorting and cooling, a gravy which is free-flowing from a can and coats the meaty slices to provide a high sheen;

(g) filling cans with said meaty pieces and gravy; and (h) retorting the cans.

13. A process according to claim 12 wherein the sheet is sliced into meaty pieces by first slitting the sheet along a plurality of lines parallel to its direction of movement to produce a plurality of meaty strips; and then slicing the strips transversely to their long axes to produce thin meaty slices with a minimum of fines and broken or ragged pieces.

* * * * *